Nov. 6, 1923.
T. H. STOUGH
ICE CREAM FREEZER
Filed May 11, 1923
1,473,588
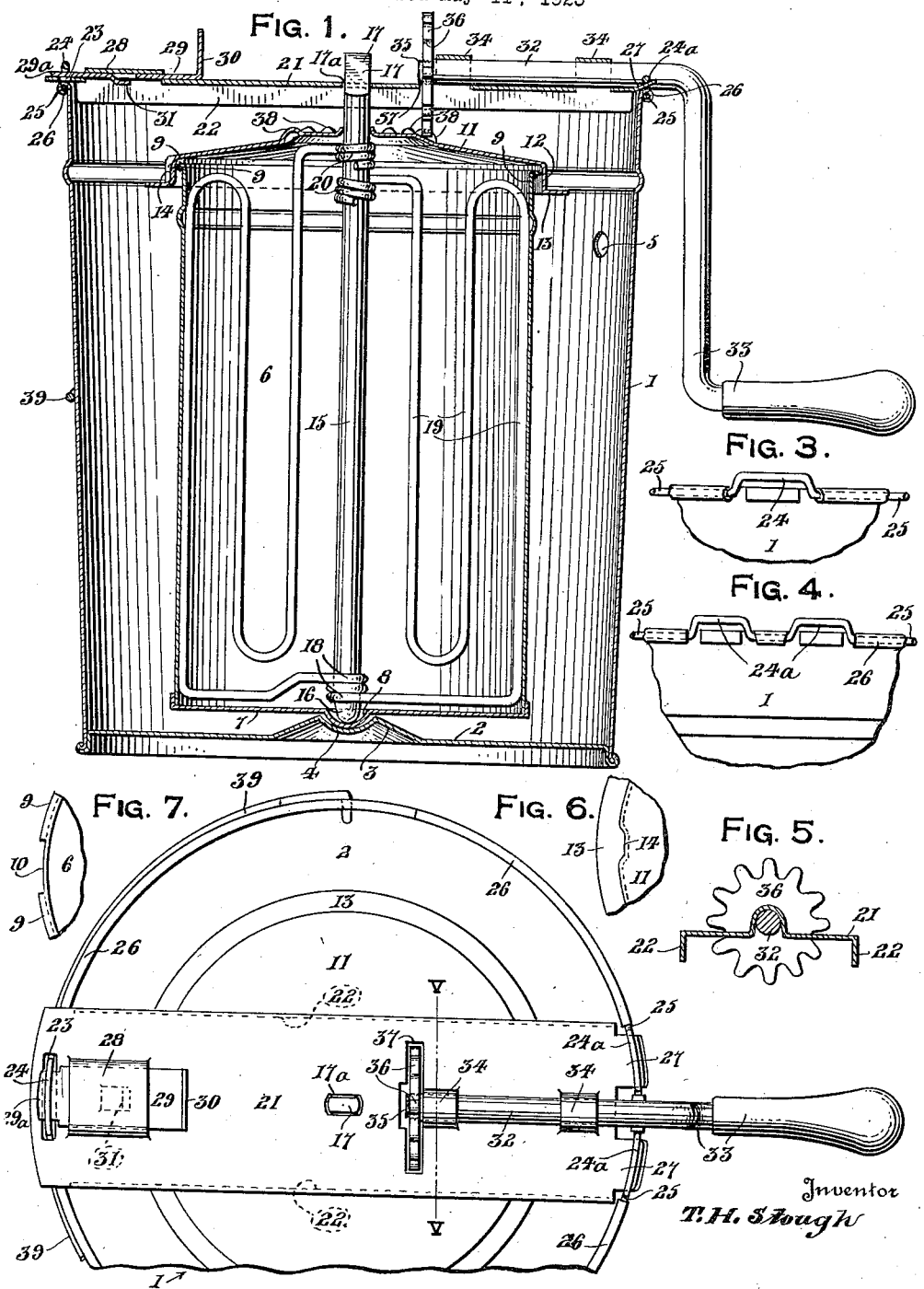

Patented Nov. 6, 1923.

1,473,588

UNITED STATES PATENT OFFICE.

TURNEY H. STOUGH, OF JEANNETTE, PENNSYLVANIA, ASSIGNOR TO JEANNETTE TOY & NOVELTY CO., OF JEANNETTE, PENNSYLVANIA, A CORPORATION OF PENNSYLVANIA.

ICE-CREAM FREEZER.

Application filed May 11, 1923. Serial No. 638,366.

*To all whom it may concern:*

Be it known that I, TURNEY H. STOUGH, a citizen of the United States of America, residing at Jeannette, in the county of Westmoreland and State of Pennsylvania, have invented certain new and useful Improvements in Ice-Cream Freezers, of which the following is a specification.

This invention relates to certain new and useful improvements in ice cream freezers wherein the cross bar for supporting the driving or operating mechanism for the cream can is struck from sheet metal, thereby reducing the cost of manufacture and permitting quantity production.

Another object of the invention having a view of reducing the cost of manufacture, includes a novel type of driving connection between the cream can and the operating shaft carried by the sheet metal cross bar of the freezer, an interlocking connection being provided between the cream can and cover.

A further object of the invention is to improve the anchoring means for securing the cross bar or bridge to opposite sides of the freezer receptacle and for locking the same in position thereon.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a vertical sectional view of an ice cream freezer constructed in accordance with the present invention showing the cross bar or bridge struck from sheet metal and secured at its opposite ends to the upper edges of the freezer receptacle, and further showing the upwardly directed integral forces or projections constituting gear teeth to be engaged by the driving gear wheel, Figure 2 is a fragmentary top plan view showing the locking slide bar retaining the bridge in position, Figure 3 is a detail elevational view showing the retaining loop for one end of the bridge with which the locking slide bar is associated, Figure 4 is a detail elevational view showing the two anchoring loops for the other end of the bridge, Figure 5 is a detail sectional view taken on line V—V of Fig. 2 showing the crank shaft and driving gear supported in the bridge, Figure 6 is a fragmentary top plan view of the cream can cover showing the inwardly directed lugs carried by the side flange thereof, and Figure 7 is a fragmentary top plan view of the cream can showing the groove or indentation in the bead at the upper edge thereof to be engaged by the cover lugs.

Referring more in detail to the accompanying drawing, there is illustrated an ice cream freezer including an outer freezer receptacle 1 having a bottom wall 2 having a centrally positioned upwardly directed boss 3 provided with a central bearing cavity 4 as clearly shown in Fig. 1. The freezer receptacle 1 is open at its upper end and is provided with an overflow opening 5 that is disposed below the upper end of the cream can as illustrated.

The cream can 6 has the bottom wall 7 thereof provided with a centrally positioned depending bearing 8 that is received in the cavity 4 of the boss 3 spacing the bottom wall 7 of the cream can from the bottom wall 2 of the freezer receptacle. The upper edge of the cream can 6 is provided with an outwardly directed flange 9 having a portion thereof cut away as at 10 to provide a recess. The cover 11 for the cream can 6 carries a depending peripheral edge wall 12 flanged outwardly as at 13 at its lower end, the wall 12 engaging the outer edge of the flange 9 upon the cream can to form a substantially tight closure therefor. As shown more clearly in Figs. 1 and 6, the side walls 12 of the cream can cover is provided with a struck-in lug 14 that is adapted to be received in the recess 10 of the cream can flange 9 to form an interlocking connection between the cream can 6 and cover 11.

The cream can 6 being rotatable in the freezer receptacle 1, houses a stationary dasher including a vertical shaft 15 having its lower end 16 bearing in the socket 8 while the upper end thereof extends through a central opening in the cover 11 with the upper terminal end of polygonal formation as indicated at 17. Dasher arms are carried by the shaft 15 and embodies a relatively heavy wire that is twisted intermediate its ends as at 18 to enclose and be fixed to the lower end of the shaft 15, the wire being bent intermediate its ends to provide vertical arms 19, the outermost arm preferably contacting the inner face of the cream can 6 as shown in Fig. 1 with the ends of the dasher arms twisted about and secured to the upper end of the shaft 15 as at 20.

A cross bar or bridge 21 struck from sheet metal and having depending reinforcing side flanges 22 extends across the upper end of the freezer receptacle 1 and has a transverse slot 23 formed in one end thereof through which the upwardly directed loop portion 24 of a wire frame 25 extends, the wire frame 25 forming a reinforce for the bead 26 at the upper edge of the freezer receptacle 1. The opposite end of the bridge 21 is bifurcated to provide a pair of seats 27 that extend through upwardly directed loop portions 24ª of the wire frame 25 as clearly shown in Fig. 4. To retain the bridge 21 upon the upper end of the freezer receptacle, a guide 28 is struck-up therefrom adjacent the end slots 23, a locking bar 29 slightly engage the bridge being slidably mounted beneath the guide 28, one end of the sliding locking bar 29 being bent upwardly as at 30 to provide a finger grip while the forward end 29ª thereof is adapted to be projected through the wire loop 24 to lock the bridge upon the freezer receptacle. Movement of the locking bar 29 during releasing thereof is limited by the finger 31 struck-out and depending therefrom as clearly shown in Fig. 1.

The upper bead end 17 of the dasher shaft 15 extends through a similarly formed opening 17ª in the bridge 21 for holding the dasher against rotation. The horizontal shaft 32 of the crank arm 33 is journaled upon the bridge 27 in spaced guide straps 34 that are set upon the bridge as clearly shown in Figs. 1, 2 and 5, the free threaded end 35 of the shaft 32 having a threaded engagement with the toothed wheel 36 that projects through the transverse opening 37 formed in the bridge. The cream can cover 11 is provided with a circular series of struck-up adjacently positioned bosses 38 forming spaced teeth to be engaged by the toothed wheel 36.

From the above detail description of the device, it is believed that the construction and operation thereof will at once be apparent, it being noted that the cost of production is materially decreased by forming the cream and freezer receptacles as well as the cross bridge from sheet metal. By rotating the shaft 32 through the crank handle 33, the toothed wheel 36 engaging the spaced teeth 38 upon the cream can cover 11 that is locked upon the cream can 6, the cream can is rotated within the freezer receptacle 1 upon its lower end bearing with the shaft 15 carrying the dasher blades 19 maintained stationary by its key connection 17 with the bridge 21. A handle 39 provided for the freezer receptacle 1 as shown in Figs. 1 and 2 facilitate the handling of the freezer, and with a device of this character and manufactured in one and two quart sizes, permits easy and quick freezing of the desired fluid in a minimum of time and embodying only slight labor.

While there is herein shown and described the preferred embodiment of the present invention, it is nevertheless to be understood that minor changes may be made therein without departing from the spirit and scope of the invention as claimed.

What is claimed as new is:—

1. In an ice cream freezer embodying a freezer receptacle and a cream can rotatable therein with a stationary dasher in the cream can, a bridge piece struck from sheet metal extending across the upper edge of the freezer receptacle, cooperating devices carried by the receptacle and bridge for locking the latter in position, the connection between the freezer receptacle and bridge piece including a single wire loop extending upwardly from the upper edge of the freezer receptacle and a pair of similar loops diametrically opposite the single loop, one edge of the bridge having a transverse slot through which the single loop projects, a pair of legs at the other end of the bridge extending into the pair of loops, and a sliding lock plate carried by the bridge and extending into the single loop for locking the bridge on the freezer receptacle.

2. In an ice cream freezer embodying a freezer receptacle and a cream can rotatable therein with a stationary dasher in the cream can, a bridge piece struck from sheet metal having interlocking engagement with the upper edge of the freezer receptacle, struck up bearing straps carried by the bridge, a crank shaft having a horizontal portion journaled in the bearing straps, gear connections between the horizontal portion of the crank shaft and the cream can, the connection between the freezer receptacle and bridge piece including a single wire loop extending upwardly from the upper edge of the freezer receptacle and a pair of similar loops diametrically opposite the single loop, one edge of the bridge having a transverse slot through which the single loop projects, a pair of legs at the other end of the bridge extending into the pair of loops, and a sliding lock plate carried by the bridge and extending into the single loop for locking the bridge on the freezer receptacle.

3. In an ice cream freezer embodying a freezer receptacle and a cream can rotatable therein with a stationary dasher in the cream can, a bridge piece struck from sheet metal extending across the upper edge of the freezer receptacle, cooperating devices carried by the receptacle and bridge for locking the latter in position, struck up bearing straps carried by the bridge, a crank shaft having a horizontal portion journaled in the bearing straps, gear connections between the horizontal portion of the crank shaft and the cream can, the connection between the freezer receptacle and bridge piece including a single wire loop extending upwardly from the upper edge of the freezer receptacle and a pair of similar loops diametrically opposite the single loop, one edge of the bridge having a transverse slot through which the single loop projects, a pair of legs at the other end of the bridge extending into the pair of loops, and a sliding lock plate carried by the bridge and extending into the single loop for locking the bridge on the freezer receptacle.

4. In an ice cream freezer embodying a freezer receptacle and a cream can rotatable therein with a stationary dasher in the cream can, a bridge piece struck from sheet metal having interlocking engagement with the upper edge of the freezer receptacle struck up bearing straps carried by the bridge, a crank shaft having a horizontal portion journaled in the bearing straps, gear connections between the horizontal portion of the crank shaft and the cream can, said gear connections including a toothed wheel having a threaded axial opening receiving the threaded end of the horizontal portion of the crank shaft, struck-up portions on the cream can cover arranged in circular series forming teeth for cooperation with the toothed wheel, the connection between the freezer receptacle and bridge piece including a single wire loop extending upwardly from the upper edge of the freezer receptacle and a pair of similar loops diametrically opposite the single loop, one edge of the bridge having a transverse slot through which the single loop projects, a pair of legs at the other end of the bridge extending into the pair of loops, and a sliding lock plate carried by the bridge and extending into the single loop for locking the bridge on the freezer receptacle.

5. In an ice cream freezer embodying a freezer receptacle and a cream can rotatable therein with a stationary dasher in the cream can, a bridge piece struck from sheet metal extending across the upper edge of the freezer receptacle, cooperating devices carried by the receptacle and bridge for locking the latter in position, struck up bearing straps carried by the bridge, a crank shaft having a horizontal portion journaled in the bearing straps, gear connections between the horizontal portion of the crank shaft and the cream can, said gear connections including a toothed wheel having a threaded axial opening receiving the threaded end of the horizontal portion of the crank shaft, struck-up portions on the cream can cover arranged in circular series forming teeth for cooperation with the toothed wheel, the connection between the freezer receptacle and bridge piece including a single wire loop extending upwardly from the upper edge of the freezer receptacle and a pair of similar loops diametrically opposite the single loop, one edge of the bridge having a transverse slot through which the single loop projects, a pair of legs at the other end of the bridge extending into the pair of loops, and a sliding lock plate carried by the bridge and extending into the single loop for locking the bridge on the freezer receptacle.

In testimony whereof I affix my signature.

TURNEY H. STOUGH.